United States Patent Office 3,228,496
Patented Jan. 11, 1966

3,228,496
AUTOMATIC GEAR-CHANGE MECHANISM
Wilhelm Riehl, Raunheim (Main), Germany, assignor to General Motors Corporation, Detroit, Mich., a corporation of Delaware
Filed Oct. 31, 1962, Ser. No. 234,333
Claims priority, application Germany, Nov. 4, 1961, O 8,350
11 Claims. (Cl. 192—3.5)

This invention relates to automatic gear-change mechanisms for effecting regulation of a servo-controlled clutch conjointly with alternative engagement of gears in a servo-controlled gearbox, and is particularly though not exclusively suitable for use in automobile gear-change mechanisms.

It is one obejct of the present invention to provide an automatic gear-change mechanism of the type described in which the manual override of the automatic gear-change is possible.

It is another object of the invention to provide an automatic gear-change mechanism of the type described in which manual gear-change is accompanied by disengagement and engagement of the clutch responsive to movement of the gear lever.

It is a further object of the invention to provide an automatic gear-change mechanism of the type described including a preselector switch actuated by the servo piston of a gear-change servo to preselect the mechanism for engagement of another gear.

It is yet another object of the invention to provide an automatic gear-change mechanism of the type described in which the piston rod of a gear-change servomotor has a pair of stop positions corresponding to engagement of a pair of gears and also an intermediate stop position which is assumed during manual gear-change.

It is a further object of the invention to provide an automatic gear-change mechanism of the type described in which the clutch regulation and conjoint gear engagement are under the control of a relay assembly containing an automatic portion which is under the control of a change-over switch in response to the opposed pressures of a throttle lever linkage and an output shaft, and also contains a portion under the control of a manual gearshift lever on operation of which the automatic operation of the relay assembly is made ineffective.

Further objects and advantages of the present invention will be apparent from the following description of a preferred embodiment of an automatic gear-change mechanism according to the present invention as applied to the control of a motor vehicle transmission, reference being had to the accompanying drawings.

Figure 1:
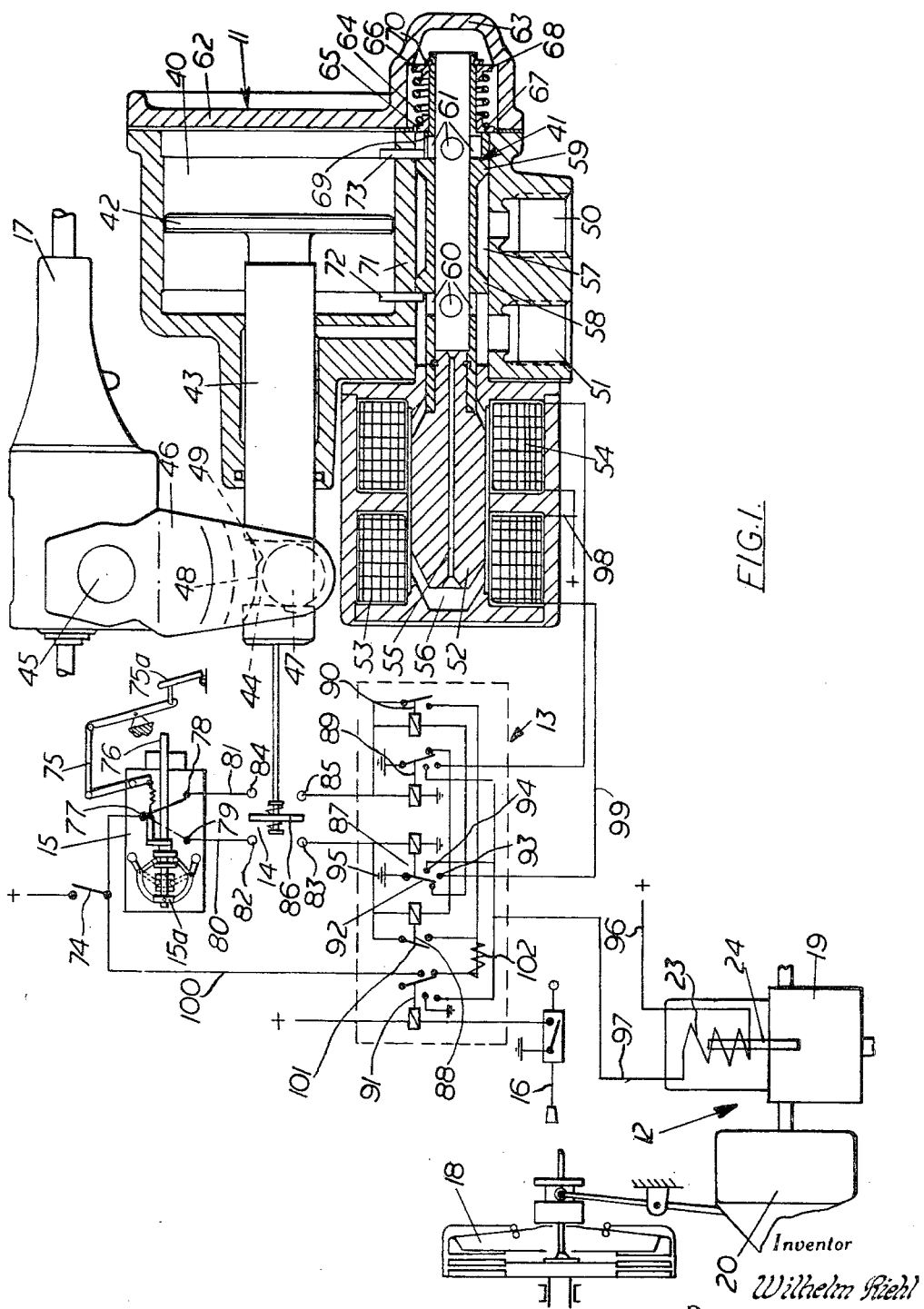
FIG. 1 shows the lay-out of the complete automatic gear-change mechanism.

The automatic gear-change mechanism shown in the drawings is adapted to give automatic changes between two gear ratios of a multi-forward speed and reverse gear box. For example, the mechanism can be utilized for automatic changes between the 2nd and 3rd gears of a three forward speed and reverse gearbox as shown i.e. in U.S. Patent 2,811,865 or between the 3rd and 4th gears of a four forward speed and reverse gear box, as shown i.e. in U.S. Patent 2,942,492. Broadly, as illustrated in FIG. 1, the mechanism comprises a gear-change assembly 11 which effects hydraulic operation of a conventional three or four forward speed and reverse gear box 17 on completion of an electrical circuit, a clutch-regulating assembly 12 for the hydraulic regulation of a clutch 18 on completion of an electrical circuit, a relay assembly 13 for completing the electrical circuits to effect gear-change and clutch regulation, a preselector switch 14, a vehicle-controlled change-over switch 15 for conditioning the relay assembly for either a down-change condition or an up-change condition, and a manual gear-lever 16.

*Clutch-regulating assembly 12*

Figure 2:
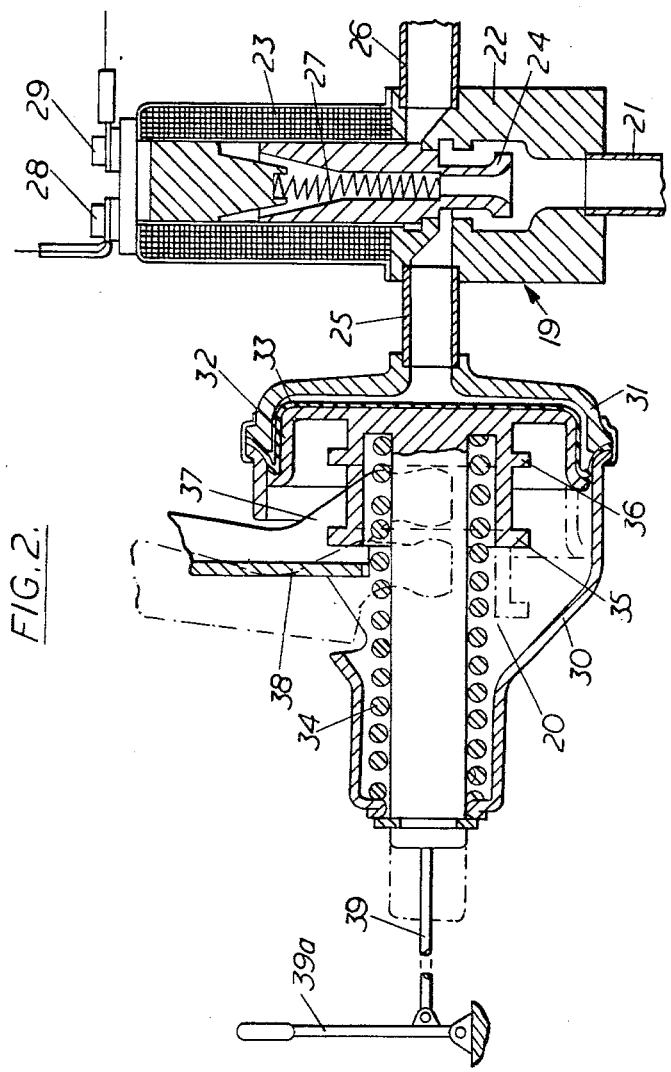
FIG. 2 is a cross-section of a clutch-regulating assembly forming part of the gear-change mechanism.

The clutch-regulating assembly 12 for hydraulic actuation of the clutch 18 comprises a control valve 19 and a servomotor 20, these parts being shown in greater detail in FIG. 2. Pressure oil for the hydraulic actuation of the clutch is taken from some source which will suppy the oil at a pressure which is subject to the speed of the engine, for example the pressure oil system of the engine, the pressure oil entering a valve housing 22 for the control valve 19 through an input pipe 21. The valve housing 22 contains a slidable valve member 24, the valve member normally being urged downwardly by means of a helical spring 27 into the position illustrated in FIG. 2, in which pressure fluid from the input pipe 21 can flow past the lower end of the valve member and through a feed pipe 25 to the servomotor 20. The valve member 24 is also under the control of a clutch disengagement solenoid 23, which has a positive terminal 29, and also has a control terminal 28 which can be connected to ground through the relay assembly 13 to complete an electrical circuit through the solenoid, thereby energizing the solenoid. On energization of the solenoid the valve member 24 is moved upwardly against the force of the spring 27 into an upper position in which the feed pipe 25 to the servomotor, instead of being connected to the input pipe 21, is connected to a return pipe 26 through which oil can flow from the servomotor back to the engine sump.

The servomotor 20 comprises a hydraulic cylinder made up of housing portions 30 and 31. A servo piston 32 is slidable in the servo cylinder, and is associated with a resilient diaphragm 33 which is sealingly retained between adjacent edges of the housing portions 30 and 31. The servo piston is displaceable to the left against the force of a helical spring 34 by means of pressure oil supplied through the feed pipe 25. The servo piston 32 has a short annular extension provided with spaced flanges 35 and 36 which define between them an annular groove 37. One end of a clutch actuation lever 38 engages in the groove: when pressure oil is not being supplied to the servo cylinder the lever is in the position indicated in solid lines in FIG. 2, in which position the clutch 18 is disengaged. When valve member 24 is in its FIG. 2 position, pressure oil is supplied to the servomotor 20 by way of the control valve 19 and the feed pipe 25, the servo piston 32 is moved to the left against the force of the helical spring 24 and moves the lever 38 into the position indicated in interrupted lines in FIG. 2, in which position the clutch is engaged.

The servo piston 32 is connected by way of a cable 39 to a hand lever 39a. Movement of the hand lever to tension the cable 39 holds the servo piston 32 in its left-hand, clutch-engaged position irrespective of the position of the control valve 19, that is, the hydraulic actuation of the clutch is temporarily made ineffective.

*Gear-change assembly 11*

The gear-change assembly 11 includes a servomotor 40 having a servo piston 42 which can be moved to the left or right by pressure oil supplied by appropriate movement of a control valve member 41. Like the pressure oil for the hydraulic actuation of the clutch, the pressure oil for actuation of the servomotor 40 is taken from the pressure oil system of the engine or from some other source which will supply the oil at a pressure which is subject to the speed of the engine.

The servo piston 42 has a piston rod 43 provided with a cross-groove 44 engaged by a nose-like crank pin 47 of a gear lever crank arm 46 which is secured to a gear selector rod 45 projecting from the gearbox 17. The gears in the gearbox are arranged in the conventional manner such that the gear selector rod 45 may assume a first axial position in which rotational movement of the selector rod about its axial will engage first or reverse gear, dependent on the direction of rotation or the gear selector rod may be displaced axially into a second axial position in which clockwise rotational movement of the gear selector rod about its axis effects engagement of 3rd gear and counterclockwise rotational movement effects engagement of 2nd gear. In the second axial position of the gear selector rod 45, the rotational movement is imparted to the rod by movement of the servomotor piston 42, but in the first axial position of the gear selector rod, that is, the position for engagement of first and reverse gears, rotational movement is imparted to the selector rod manually, a segment 48 located in a different plane from that of the crank pin 47 during this operation engaging a corresponding depression 49 in the piston rod 43 to prevent axial displacement of the piston rod.

The gear-change assembly 11 includes an oil inlet 50 for pressure oil to be used for movement of the servo piston 42, and an oil outlet 51 for oil displaced by movement of the servo piston. The supply of pressure oil to one side or the other of the servo piston 42 is under the control of the valve member 41, one end of which is connected to an iron core 52 which projects between a downchange solenoid 53 and an up-change solenoid 54, these solenoids being arranged coaxially and spaced a small distance apart. The iron core is provided with a through bore 55 to allow oil to flow into or out of a space 56 at the left-hand end of the core. The control valve member 41 comprises a hollow cyinder, and defines an annular central space 57 bounded at either end by spaced control flanges 58 and 59 of the valve member. The valve member also includes cross-bores 60 and 61 for the outflow of oil displaced by movement of the servo piston 42.

The servomotor 40 is closed at its right-hand end by means of a cover plate 62 and a conventional gasket. The cover plate includes a projecting portion 63 which provides a suitable cavity into which the right-hand end of the control valve member 41 extends.

The control valve member is normally maintained in a centered position by means of a compression spring 64 seated at its two ends on thrust plates 65 and 66 which bear against fixed stops 67 and 68 and are retained on the valve member by means of stops 69 and 70. With the control valve member 41 in its centered position the crossbores 60 and 61 are directly beneath slots 72 and 73 in the cylinder 71 of the servomotor 40, whereby both sides of the servo piston are placed in communication with the oil outlet 51. When the control valve member 41 is moved to the left or right by energization of one or other of the solenoids 53 and 54, the control flanges 58 and 59 of the valve member connect the appropriate side of the servo piston 42 to the oil inlet 50 and the other side to the oil outlet 51 to effect movement of the piston rod 43.

If the valve member 41 and thrust plate 66 have been moved to the left on energization of solenoid 53 to compress spring 64 and that solenoid is subsequently deenergized, the spring seated on thrust plate 65 acts through thrust plate 66 to shift the valve member to the right. The valve member will be centered when thrust plate 66 contacts stop 68 on cover plate 62. If the valve member and thrust plate 65 have been moved to right by solenoid 54 again compressing spring 64 and that solenoid is subsequently deenergized, the spring seated on thrust plate 66 acts on thrust plate 65 to move the valve member to the left and centers it when thrust plate 65 engages stop 67 on housing 71.

*Electrical controls*

The electrical controls include the relay assembly 13, the preselector switch 14, the change-over switch 15 and a main switch 74 by means of which the electrical controls can be put into operation. This main switch can if desired be a rotary type switch, for example, and may for instance be incorporated in the choke knob.

The change-over switch 15 is controlled by the opposed actions of, on the one hand, a torque demand control means such as a throttle valve linkage 75, and, on the other hand, a control pressure derived from rotation of a speed-responsive shaft 76 which may for example branch off from the speedometer drive. When the accelerator pedal 75a is depressed by the operator, the throttle valve linkage 75 will transmit the force exerted by the operator through a spring member to tend to turn the switch lever clockwise, as viewed in FIG. 1. A governor 15a secured to, and responsive to rotation of, the transmission-driven shaft 76 exerts a counter force on the switch lever tending to turn the switch lever counterclockwise. Instead of one of the control pressures being derived from the throttle valve linkage 75 as illustrated in FIG. 1, a control pressure may if desired be derived from a servomotor actuated by carburetor suction.

These opposed control pressures act on a switch lever 77 for the change-over switch 15 in the manner conventional in automatic transmission: namely the switch lever is moved in one direction to effect a down-change when the pressure derived from the throttle valve linkage exceeds that derived from the speed-responsive shaft, and the switch lever is moved in the other direction to effect an up-change when the pressure derived from the speed-responsive shaft exceeds that derived from the throttle valve linkage, whereby the desired result is obtained that with a wide-open throttle the up-change is delayed until the vehicle is travelling at a speed higher than would cause an up-change at a lower throttle pressure.

For a change from 3rd into 2nd gear the switch lever 77 is moved into contact with a terminal 79, and for a change from 2nd into 3rd gear the switch lever is moved into contact with a terminal 78. The terminals 79 and 78 are connected by way of leads 80 and 81, respectively, to terminals 82, 83, 84 and 85 of the preselector switch 14, further connection from the terminal 83 being to a part of the relay assembly 13 concerned with down-change and from the terminal 85 to a part of the relay assembly concerned with up-change, as will be described hereafter. A bridging contact member 86 of the preselector switch is movable with the piston rod 43 of the servo piston 42 for the gear change assembly 11: movement of the piston rod 43 to the left to effect engagement of 3rd gear causes the contact member 86 to bridge the terminals 82 and 83 and thereby preselect 2nd gear; movement of the piston rod 43 to the right to engage 2nd gear moves the contact member 86 to the right to bridge terminals 84 and 85 and thereby preselect 3rd gear.

The relay assembly 13 includes a downchange relay 87 associated with a hold-on relay 88, for energization of the downchange solenoid 53 in the gear-change assembly 11, and an upchange relay 89 associated with a hold-on relay 90, for energization of the upchange solenoid 54 in the gear-change assembly. The relay assembly also includes a manual relay 91 which is actuated by movement of the gear lever 16. Since the gear-change and hold-on relays for effecting a downchange and an upchange are identical, it will be sufficient to describe the operation of the relays with reference to the downchange relay 87 and its hold-on relay 88.

When the main switch 74 is closed and the bridging contact member 86 of the preselector switch 14 is in its left-hand position, in which it bridges the terminals 82 and 83, movement of the switch lever 77 into its lefthand position in response to the opposed control pressures causes energization of the downchange relay 87, and additionally the hold-on relay 88 for the downchange relay is energized by way of a ground connection through the closed upchange relay 89. This energization of the downchange relay 87 causes its switch lever 92 to be moved to the right to connect a downchange terminal 93 and a clutch-disengagement terminal 94 to the chassis at an earth connection 95. As a result, current can flow, via a positive lead 96, through the clutch-disengagement solenoid 23 and by way of a control lead 97 to the clutch-engagement terminal 94 and so to ground, thereby energizing the clutch-disengagement solenoid 23; conjointly, current can flow, via a positive lead 98, through the downchange solenoid 53 and by way of a control lead 99 to the downchange terminal 93 and so to earth, thereby energizing the downchange solenoid to cause leftward movement of the control valve member 41 of the gear-change assembly 11.

Thus the effect of the movement of the switch lever 77 to the left is to energize the clutch-disengagement solenoid 23, thereby disengaging the clutch 18, and conjointly to energize the downchange solenoid 53, thereby moving the valve member 41 to the left to supply pressure fluid to the left-hand side of the servo piston 42 and thereby move the piston rod 43 to the right to effect engagement of second gear.

This movement of the piston rod to the right causes the bridging contact member 86 of the preselector switch 14 to move to the right also, out of contact with the terminals 82 and 83 and into contact with the terminals 84 and 85: the current flow via the terminals 82 and 83 to the downchange relay 87 is thereby interrupted. However, the relay 87 remains energized because there is an alternative current path from the main switch 74 through a by-pass lead 100 and by way of a switch lever 101 of the hold-on relay 88 to the downchange relay. The alternative path via the by-pass lead 100 includes a delayed cut-off relay 102: the purpose of the relay 102 is to open for a brief period after current has flowed through the by-pass lead 100 for a short time, for example 2 seconds, sufficient for completion of the downchange. When the current flow through the by-pass lead 100 is cut off by the relay 102, the downchange relay 87 and its hold-on relay 88 receive no more current and are therefore deenergized, whereby the switch levers 92 and 101 can assume a neutral position. The movement of the switch lever 92 to a neutral position breaks the circuit through the terminal 94 to the clutch-disengagement solenoid, thereby deenergizing this solenoid and allowing the clutch to reengage by the action of engine oil pressure on piston 32, and also breaks the circuit through the terminal 93 to the downchange solenoid 53, whereby this solenoid also is deenergized. The compression spring 64 then returns the valve member 41 of the control valve 19 to its centered position, in which equal pressures exist on the two sides of the servo piston; this does not, however, produce any movement of the servo piston 42, which remains in the position in which second gear is engaged.

The subsequent movement of the delayed cut-off relay 102 back to its original closed-circuit condition has no effect on the downchange relay 87 and its hold-on relay 88 because the switch lever 101 of the hold-on relay is then in a neutral, open-circuit position, so that current cannot reach the relays 87 and 88. The mechanism is in effect in a "preselect" condition for an upchange into the third gear ratio, and remains in this preselect condition until the opposed presures acting on the switch lever 77 of the change-over switch 15 move this switch lever into its right-hand position into contact with the terminal 78; thereupon current can flow in the circuit including the terminals 84 and 85, which were bridged by the bridging contact member 86 of the preselector switch to initiate the preselect condition. The movements of the relays for the upchange correspond to those described for downchange: the result of the changes which take place in the relay assembly 13 is that the disengagement solenoid 23 is energized to effect disengagement of the clutch for a gear-change, and the upchange solenoid 54 is energzied to effect a gear change to 3rd gear.

Thus for both downchange and upchange the speed at which the gear-change occurs is determined partly by the speed of the vehicle and partly by the amount of pressure on the throttle pedal. When the gear change has been initiated, the speed at which the gear change takes place depends on the engine speed because the clutch engagement and gear change are effected by means of pressure oil taken from a source the pressure of which is subject to the speed of the engine.

Should the driver wish to change out of the second/third group of gears, he can move the gear lever 16. This closes a switch associated with the gear lever and completes a circuit through the manual relay 91, thereby moving a switch lever of the manual relay 91 to the left and out of contact with a pair of terminals in the by-pass lead 100 to render the automatic gear-change circuit ineffective. This movement of the switch lever of the manual relay 91 to the left completes a circuit through the control lead 97, the clutch-disengagement solenoid 23 and the positive lead 96, thereby effecting disengagement of the clutch during the manual downchange. The movement of the gear lever also brings the piston rod 43 of the gear-change assembly 11 into its central position, in which the bridging contact member 86 of the preselector switch 14 is likewise in a central position between the pairs of terminals 82, 83 and 84, 85. When a manual change is made into the group of gears in which the gear-change assembly 11 operates, the operator manually shifts into second gear by appropriate operation of lever 16. The crank pin 47 engages in cross groove 44 and the piston rod 43 is manually moved by operation of lever 16. Movement of the lever 16 thus moves the piston rod and the attached contact 86. The contact, by this piston-rod movement, bridges terminals 84, 85 to preselect third gear. This gear change will occur when the force from the speed-responsive governor overcomes the opposing force from the torque demand linkage 75 and the switch lever is forced into engagement with the contact 78. It will be seen that the automatic gear-change mechanism then takes over, in dependence on the position of the change-over switch 15, to effect automatic gear-change and conjoint clutch actuation.

I claim:

1. An automatic gear-change mechanism for effecting regulation of a servo-controlled clutch conjointly with alternative engagement of a pair of ratios in a servo-controlled gear box, the mechanism comprising, control means for said gear box having a first and a second ratio drive condition, an upchange solenoid operatively connected to said control means energizable to condition said control means for said first ratio drive condition, a downchange solenoid operatively connected to said control means energizable to condition said control means for said second ratio drive condition, clutch operating means, clutch actuating solenoid means energizable to condition the clutch operating means for clutch disengagement, a torque demand control means, a first circuit for said upchange solenoid and a second circuit for said downchange solenoid, change-over switch means movable in response to opposed pressures dependent on the transmission speed of the gear box and the position of said torque demand control means to energize said clutch actuation solenoid means and to selectively complete said first circuit or said second circuit.

2. An automatic gear-change mechanism for effecting regulation of a servo-controlled clutch conjointly with alternative engagement of a pair of ratios in a servo-controlled gear box, the mechanism comprising, control means for said gear box having a first and a second ratio drive condition, an upchange solenoid operatively connected to said control means energizable to condition said control means for said first ratio drive condition, a downchange solenoid operatively connected to said control means energizable to condition said control means for said second ratio drive condition, clutch operating means, clutch actuating solenoid means energizable to condition the clutch operating means for clutch disengagement, a torque demand control means, a first circuit for said upchange solenoid and a second circuit for said downchange solenoid, change-over switch means movable in response to opposed pressures dependent on the transmission speed of the gear box and the position of said torque demand control means to selectively complete said first circuit or said second circuit, said first circuit having first relay means which responds to the completion of said first circuit to energize said upchange solenoid and conjointly energize said clutch actuation solenoid, said second circuit having second relay means which responds to completion of said first circuit to energize said upchange solenoid and conjointly energize said clutch actuation solenoid, a movable gearshift lever, and means operatively connecting said lever to said first and second relay means such that on movement of said gear shift lever said clutch actuation solenoid is energized without energization of said upchange or downchange solenoids.

3. An automatic gear-change mechanism for effecting regulation of a servo-controlled clutch conjointly with alternative engagement of a pair of ratios in a servo-controlled gear box, the mechanism comprising controll means for said gear box having a first and a second ratio drive condition, an upchange solenoid operatively connected to said control means energizable to condition said control means for said first ratio drive condition, a downchange solenoid operatively connected to said control means energizable to condition said control means for said second ratio drive condition, clutch operating means, clutch actuating solenoid means energizable to condition the clutch operating means for clutch disengagement, a torque demand control means, a first circuit for said upchange solenoid and a second circuit for said downchange solenoid, change-over switch means movable in response to opposed pressures dependent on the transmission speed of the gear box and the position of said torque demand control means to selectively complete said first circuit or said second circuit, preselector switch means connected in said circuits having a bridging contact member movable in response to movement of said gear box control means to open one of said circuits and close the other of said circuits, said circuits including a relay means responsive to completion of one of said circuits to energize one of said first-mentioned solenoids and conjointly energize said clutch actuation solenoids, a movable gearshift lever, and means operable by said lever to permit energization of said clutch actuation solenoid without energization of said first-mentioned solenoids.

4. A mechanism according to claim 3 wherein said preselector switch has two stop positions for the gears to be preselected and an intermediate stop position for manual gear change.

5. An automatic gear-change mechanism for effecting regulation of a servo-controlled clutch conjointly with alternative engagement of a pair of ratios in a servo-controlled gear box, the mechanism comprising, control means for said gear box having a first and a second ratio drive position, an upchange solenoid operatively connected to said control means energizable to condition said control means for said first ratio drive condition, a downchange solenoid operatively connected to said control means energizable to condition said control means for said second ratio drive condition, spring means for positioning said control means between said first and second ratio drive positions when said solenoids are deenergized, clutch operating means, clutch actuating solenoid means energizable to condition the clutch operating means for clutch disengagement, a torque demand control means, a first circuit for said upchange solenoid and a second circuit for said downchange solenoid, change-over switch means movable in response to opposed pressures dependent on the transmission speed of the gear box and the position of said torque demand control means to selectively complete said first circuit or said second circuit, said first and second circuits including relay means for selectively energizing said upchange solenoid and said clutch actuation solenoid or said downchange solenoid and said clutch actuation solenoid, a manual gearshift lever, and circuit means connected to said relay means and actuated by said lever to permit energization of said clutch actuating solenoid without energization of said upchange and downchange solenoids.

6. An automatic gear-change mechanism for effecting regulation of a servo-controlled clutch conjointly with alternative engagement of a pair of ratios in a servo-controlled gear box, the mechanism comprising control means for said gear box having a first and a second ratio drive condition, an upchange solenoid operatively connected to said control means energizable to condition said control means for said first ratio drive condition, a downchange solenoid operatively connected to said control means energizable to condition said control means for said second ratio drive condition, clutch operating means, clutch actuating solenoid means energizable to condition the clutch operating means for clutch disengagement, a torque demand control means, a first circuit for said upchange solenoid and a second circuit for said downchange solenoid, change-over switch means movable in response to opposed pressures dependent on the transmission speed of the gear box and the position of said torque demand control means to selectively complete said first circuit or said second circuit, a preselector switch connected in said circuits, said preselector switch having a bridging contact member, said contact member being operatively connected to said control means for movement therewith to open one of said circuits and close the other of said circuits, a relay assembly for said circuits including an upchange relay and a hold-on relay for said first circuit operable to energize said upchange solenoid and said clutch actuating solenoid means, said relay assembly also including a downchange relay, and a hold-on relay for said second circuit operable to energize said downchange solenoid and said clutch actuating solenoid means, said hold-on relays being further operable to establish a by-pass connection for energization of said clutch actuation solenoid means and said gear-change solenoid independently of the position of said preselector switch, a gearshift lever, switch means operated by said lever to break said by-pass connection to enable said clutch actuation solenoid means to be energized without energization of said upchange and downchange solenoids.

7. An automatic gear-change mechanism for effecting regulation of a servo-controlled clutch conjointly with alternative engagement of a pair of ratios in a servo-controlled gear box, the mechanism comprising control means for said gear box having a first and a second ratio drive condition, an upchange solenoid operatively connected to said control means energizable to condition said control means for said first ratio drive condition, a downchange solenoid operatively connected to said control means energizable to condition said control means for said second ratio drive condition, clutch operating means, clutch actuating solenoid means energizable to condition the clutch operating means for clutch disengagement, a torque demand control means, a first circuit for said upchange solenoid and a second circuit for said downchange solenoid, change-over switch means movable in response to opposed pressures dependent on the transmission speed of the gear box and the position of said torque demand control means to selectively complete said first circuit or said second circuit, a preselector switch connected in said circuits, said preselector switch having a bridging contact member, said contact member being operatively connected to said control means for movement therewith to open one of said circuits and close the other of said circuits, a relay assembly for said circuits including an upchange relay and a hold-on relay for said first circuit operable to energize said upchange solenoid and said clutch-actuating solenoid means, said relay assembly also including a downchange relay, and a hold-on relay for said second circuit operable to energize said downchange solenoid and said clutch-actuating solenoid means, said hold-on relays being further operable to establish a by-pass connection for energization of said clutch actuation solenoid means and said gear-change solenoid independently of the position of said preselector switch.

8. The mechanism according to claim 7 wherein said by-pass connection includes a delayed cut-off relay means for breaking said by-pass connection after current has flowed through said by-pass connection for a time sufficient for the completion of a ratio change.

9. A change-speed transmission comprising control means for changing the gear ratio of said transmission, first electromagnetic means energizable for moving said control means in one direction to provide a first gear ratio, second electromagnetic means energizable for moving said control means in an opposite direction to provide a second gear ratio, clutch means for said transmission operable to selectively engage and disengage said transmission and an engine, clutch operating means, third electromagnetic means for conditioning said clutch operating means for clutch disengagement, a source of electrical energy, first electric circuit means for connecting said source to said first and third electromagnetic means, second electric circuit means for connecting said source to said second and third electromagnetic means, a first switch means movable to a first position to connect said first circuit to said source and movable to a second position to connect said second circuit to said source, said first switch means being moved by opposing forces with one of said forces being proportional to the speed of said transmission, a second switch means connected to said control means for breaking one of said circuits and preparing the other of said circuits for energization by said source, means for biasing said control means to a neutral position when said first and second electromagnetic means are not energized.

10. An automatic gear-change mechanism for a change-speed transmission comprising, a member movable in opposite directions to change the gear ratio of said transmission, a servo motor having piston means for moving said member in opposite directions, reciprocally movable means movable to a first position for actuating said piston means to move said member in one direction and movable to a second position for actuating said piston means to move said member in an opposite direction, a first solenoid for moving said reciprocally movable means to said first position, a second solenoid for moving said reciprocally movable means to said second position, a clutch means operable to selectively connect and disconnect said transmission and a power source, means for disengaging said clutch means, electrically operated means for controlling said last-mentioned means, a source of electrical energy, a first electrical circuit for connecting said source of electrical energy to said first solenoid and said electrically-operated means, a second electrical circuit for connecting said source of electrical energy to said second solenoid and said electrically-operated means, a first switch means movable between first and second positions to connect in the first position said first circuit to said source of electrical energy and to connect in said second position said second circuit to said source of electrical energy, a second switch means movable by said piston means to first and second positions to deenergize one of said circuits and prepare the other of said circuits for energization when one of said solenoids is energized.

11. An automatic gear-change mechanism for a change-speed transmission comprising, a member movable in opposite directions to change the gear ratio of said transmission, a servo motor having piston means for moving said member in opposite directions, reciprocally movable means movable to a first position for actuating said piston means to move said member in one direction and movable to a second position for actuating said piston means to move said member in an opposite direction, a first solenoid for moving said reciprocally movable means to said first position, a second solenoid for moving said reciprocally movable means to said second position, a clutch means operable to selectively connect and disconnect said transmission and a power source, pressure means for disengaging said clutch means, a source of electrical energy, a first electrical circuit for connecting said source of electrical energy to said first solenoid and said electrically-operated means, a second electrical circuit for connecting said source of electrical energy to said second solenoid and said electrically-operated means, a movable transmission speed control member, a change-over switch movable in response to opposed pressures of transmission speed and the position of said transmission speed control member to selectively connect said circuits to said source, a preselector switch having a contact movable by said piston means to break one of said circuits and prepare the other of said circuits for energization by said source, a relay assembly for each circuit, each relay assembly having a gear-change relay and an associated hold-on relay which are energizable to permit energization of said electromagnetic means and said solenoid for that circuit, by-pass circuit means including a delayed cut-off relay connected to said source for energizing one of said solenoids and said electromagnetic means for a time sufficient for gear change when said contact member is moved to break one of said circuits, a manual gearshift means, means operated by said gearshift means for breaking said by-pass circuit means.

References Cited by the Examiner
UNITED STATES PATENTS

| | | | |
|---|---|---|---|
| 2,244,092 | 6/1941 | Wheeler | 192—3.5 |
| 2,568,958 | 9/1951 | Hey et al. | 192—3.5 |
| 2,580,125 | 12/1951 | Price | 192—3.5 |
| 2,635,722 | 4/1953 | Wemp | 192—3.5 |

DON A. WAITE, *Primary Examiner.*

DAVID J. WILLIAMOWSKY, *Examiner.*